United States Patent Office
3,429,895
Patented Feb. 25, 1969

3,429,895
2-METHYLENENAPHTHO[2,3-d]-1,3-DITHIOLE-4,9-DIONES
William Lindsay Mosby, North Plainfield, N.J., assignor to American Cyanamid Company, Stamford, Conn., a corporation of Maine
No Drawing. Filed June 16, 1965, Ser. No. 464,573
U.S. Cl. 260—327    5 Claims
Int. Cl. C07d 71/00; A01n 9/12; C09b 49/00

ABSTRACT OF THE DISCLOSURE

2 - methylenenaphtho[2,3-d]-1,3-dithiole-4,9-diones of the formula:

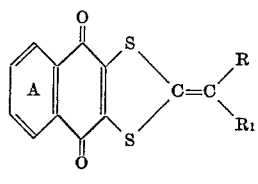

I wherein R is —$NO_2$, COOR', $CONH_2$, —COR', or $SO_2R'$; $R_1$ is hydrogen or R; R' is lower alkyl; and ring A may be substituted with halogen, lower alkyl, lower alkoxy and/or nitro groups. The compounds are useful as pigments, dyes and herbicides. The compounds are prepared by reacting the proper 2,3-dichloro-1,4-naphthoquinones and a di(alkali metal) salt of a 2-substituted 1,1-ethylenedithiol in an inert solvent.

---

This invention relates to, and has for its object, the provision of a new class of compounds. More particularly, it relates to 2-methylenenaphthol[2,3-d]-1,3-dithiole-4,9-diones of Formula I:

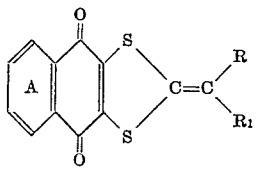

I wherein R is —CN, —$NO_2$, COOR', $CONH_2$, —COR' or $SO_2R'$; $R_1$ is hydrogen or R; R' is lower alkyl; and ring A may be substituted with halogen, lower alkyl, lower alkoxy and/or nitro groups.

The compounds of this invention are highly colored, water-insoluble and oil-soluble crystalline materials having high melting points. They are useful as pigments and dyes and have herbicidal activity as indicated by a 100% kill of corn seeds at a concentration of 500 p.p.m.

The compounds can be prepared by treating a 2,3-dichloro-1,4-naphthoquinone (Formula II) with a di(alkali metal) salt of a 2-substituted 1,1-ethylenedithiol of Formula III in accordance with the following equation:

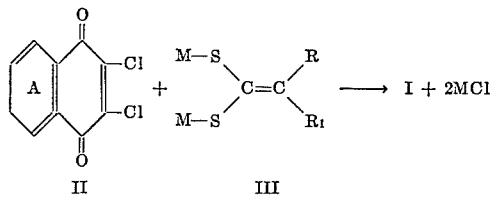

wherein R and $R_1$ are as defined above and M is sodium or potassium.

The reaction is carrier out in an inert solvent such as dimethylformamide. Approximately equimolecular amounts of the two reactants are used, although it is advantageous to use a slight excess of the salt of a substituted ethylenedithiol. The reaction temperature is not critical; ambient temperatures are normally used.

The products are isolated and purified, if desired, by conventional methods.

Compounds of Formula II which may be used include 2,3 - dichloro-1,4-naphthoquinone, 6-methyl-2,3-dichloro-1,4-naphthoquinone, 5,8 - dimethyl-2,3-dichloro-1,4-naphthoquinone, 5,8 - dimethoxy-2,3-dichloro-1,4-naphthoquinone, 2,3,5,6,7,8-hexachloro-1,4-naphthoquinone and 5-nitro2,3-dichloro-1,4-naphthoquinone.

Among the useful compounds of Formula III are the di(alkali metal) salts of 2-(dimercaptomethylene)malononitrile, 2-nitro-1,1-ethylenedithiol diethyl dimercaptomethylenemalonate, dimercaptomethylenemalonamide, 3-(dimercaptomethylene)-2,4-pentanedione, 2,2-bis(methylsulfonyl)-1,1-ethylenedithiol, etc.

The following examples, in which parts and percentages are by weight, are presented to further illustrate the present invention.

Example 1.—2-dicyanomethylenenaphtho[2,3-d]-1,3-dithiole-4,9-dione

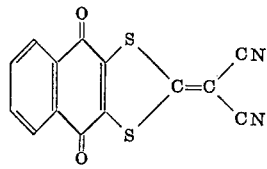

A solution of 2.20 parts (0.01 mole) of the dipotassium salt of dimercaptomethylenemalononitrile in 15 parts of dimethylformamide is added to a solution of 2.27 parts (0.01 mole) of 2,3-dichloro-1,4-naphthoquinone in 35 parts of dimethylformamide at ambient temperature. After about 30 minutes, the precipitate is separated by filtration and washed. The scarlet product, after recrystallization from chlorobenzene, melts at 338–339° C.

Example 2.—2-dicyanomethylene-5,6,7,8-tetrachloronaphtho[2,3-d]-1,3-dithiole-4,9-dione

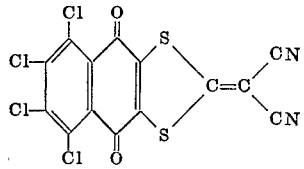

The procedure of Example 1 is followed, substituting 3.65 parts of hexachloro-1,4-naphthoquinone for the 2,3-dichloronaphthoquinone. The orange product, after recrystallization from toluene, melts at 324–327° C.

Example 3.—2-dicyanomethylene-5-nitronaphtho[2,3-d]-1,3-dithiole-4,9-dione

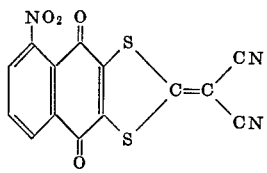

The procedure of Example 1 is followed, substituting 2.72 parts of 2,3-dichloro-5-nitro-1,4-naphthoquinone for the 2,3-dichloro-1,4-naphthoquinone. The purple product, after recrystallization from toluene, melts at 302–304° C.

Example 4.—2-nitromethylenenaphtho[2,3-d]-1,3-dithiole-4,9-dione

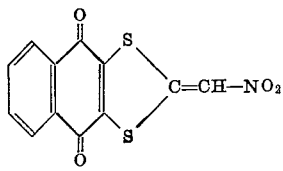

A mixture of 2.27 parts (0.01 mole) of 2,3-dichloro-1,4-naphthoquinone and 3.50 parts (0.0164 mole) of dipotassium salt of 2-nitro-1,1-ethylenedithiol in 15 parts of dimethylformamide is triturated at ambient temperature. The reaction mixture is diluted with 200 parts of water containing a trace amount of acetic acid. The precipitate is separated by filtration and washed. The purple product, after recrystallization from methyl cellosolve, melts at 258.0–259.5° C.

Example 5.—2-nitromethylene-5,6,7,8-tetrachloronaphtho[2,3-d]-1,3-dithiole-4,9-dione

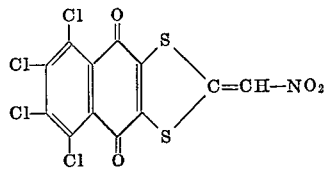

A mixture of 3.65 parts (0.01 mole) of hexachloro-1,4-naphthoquinone and 2.43 parts (0.0114 mole) of dipotassium salt of 2-nitro-1,1-ethylenedithiol in 15 parts of dimethylformamide is triturated for a few minutes at ambient temperature. The precipitate is separated by filtration and washed with methanol and water. The desired product is extracted from the residue with chloroform and recrystallized from benzene. The product melts at 277.5–278.5° C.

Example 6

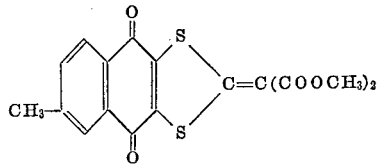

The procedure of Example 1 is followed, substituting an equivalent amount of the disodium salt of dimethyl dimercaptomethylenemalonate for the dipotassium salt of dimercaptomethylenemalononitrile. The product is obtained.

Example 7

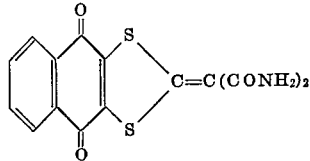

The procedure of Example 1 is followed substituting an equivalent amount of the dipotassium salt of dimercaptomethylenemalonamide for the dipotassium salt of dimercaptomethylenemalononitrile. The product is obtained.

Example 8

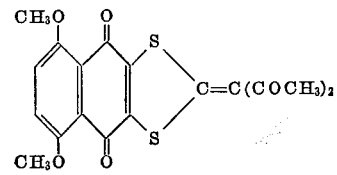

The procedure of Example 1 is followed, substituting equivalent amounts of the dipotassium salt of 3-(dimercaptomethylene)-2,4-pentanedione and 5,8-dimethoxy-2,3-dichloro-1,4-naphthoquinone for the dipotassium salt of dimercaptomethylenemalononitrile and 2,3-dichloro-1,4-naphthoquinone, respectively. The product is obtained.

Example 9

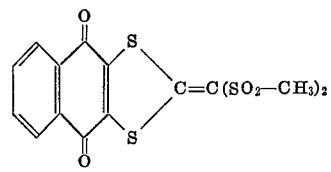

The procedure of Example 1 is followed, substituting an equivalent amount of the dipotassium salt of 2,2-bis(methylsulfonyl)-1,1-ethylenedithiol for the dipotassium salt of dimercaptomethylenemalononitrile. The product is obtained.

I claim:
1. A compound of the formula:

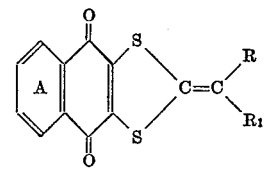

wherein R is a member selected from the group consisting of —$NO_2$, $COOR'$, $CONH_2$, —$COR'$ and $SO_2R'$; $R_1$ is a member selected from the group consisting of hydrogen and R; and R' is lower alkyl; any substituents on ring A being selected from the group consisting of tetrachloro, 5-nitro, 6-methyl and 5,8-dimethoxy.

2. The compound 2-dicyanomethylene-5,6,7,8-tetrachloronaphtho[2,3-d]-1,3-dithiole-4,9-dione.

3. The compound 2-dicyanomethylene-5-nitronaphtho[2,3-d]-1,3-dithiole-4,9-dione.

4. The compound 2-nitromethylenenaphtho[2,3-d]-1,3-dithiole-4,9-dione.

5. The compound 2-nitromethylene-5,6,7,8-tetrachloronaphtho[2,3-d]-1,3-dithiole-4,9-dione.

References Cited

UNITED STATES PATENTS 2,690,988   10/1954   Jones et al. _____ 167—33

FOREIGN PATENTS 623,104   2/1963   Belgium.

JAMES A. PATTEN, Primary Examiner.

U.S. Cl. X.R.

8—76; 71—90; 106—288